(12) United States Patent
Kanoshima et al.

(10) Patent No.: US 6,918,944 B2
(45) Date of Patent: Jul. 19, 2005

(54) CARBON CONTAINING NONFIRED AGGLOMERATED ORE FOR BLAST FURNACE AND PRODUCTION METHOD THEREOF

(75) Inventors: Hideo Kanoshima, Tokyo (JP); Seita Uekawa, Tokyo (JP); Koji Morimoto, Tokyo (JP); Shinichi Matsunaga, Kimitsu (JP); Masaaki Naito, Futtsu (JP)

(73) Assignees: Tetsugen Corporation, Tokyo (JP); Nippon Steel Corporation, Tokyo (JP)

( * ) Notice: Subject to any disclaimer, the term of this patent is extended or adjusted under 35 U.S.C. 154(b) by 69 days.

(21) Appl. No.: 10/446,638

(22) Filed: May 28, 2003

(65) Prior Publication Data

US 2004/0025633 A1 Feb. 12, 2004

(30) Foreign Application Priority Data

May 28, 2002 (JP) .................................. 2002-153640

(51) Int. Cl.$^7$ ............................................. C22B 1/242
(52) U.S. Cl. .......................................... 75/319; 75/770
(58) Field of Search ....................... 75/319, 770, 320, 75/773

(56) References Cited

U.S. PATENT DOCUMENTS

| | | | | |
|---|---|---|---|---|
| 3,725,034 A | * | 4/1973 | Joseph et al. .................. | 75/444 |
| 4,168,966 A | * | 9/1979 | Furui et al. .................... | 75/322 |
| 4,846,884 A | * | 7/1989 | Shigematsu et al. .......... | 75/771 |
| 6,676,725 B2 | * | 1/2004 | Aota et al. ..................... | 75/246 |

FOREIGN PATENT DOCUMENTS

CN        1158903        9/1997

* cited by examiner

Primary Examiner—Melvyn Andrews

(57) ABSTRACT

A nonfired agglomerated ore which is satisfactory in reduction property in the shaft of a blast furnace and excellent in rapid heating bursting property and a production method thereof are provided. A carbon containing nonfired agglomerated ore for blast furnace which is prepared in such a way that iron oxide and a carbonaceous material are blended with each other to prepare a mixture, a binder is added to the mixture, and the mixture is kneaded, formed, and cured, wherein the agglomerated ore contains carbon in the content of 80 to 120% of the theoretical carbon quantity required to reduce the reducible oxygen in the iron ores to form metallic iron, and the binder is selected so that the crushing strength may be 7,850 kN/m$^2$ or more at room temperature.

9 Claims, 6 Drawing Sheets

CARBON CONTAINING NONFIRED AGGLOMERATED ORE FOR BLAST FURNACE AND PRODUCTION METHOD THEREOF

FIELD OF THE INVENTION

The present invention relates to a nonfired agglomerated ore which is satisfactory in reduction property in the shaft of a blast furnace and has an excellent quality for the rapid heating bursting performance and a production method thereof.

BACKGROUND OF THE INVENTION

Conventionally, as a raw material for a blast furnace, there have been used agglomerated ores such as nonfired pellets and briquettes of 8 to 16 mm in diameter which are produced as follows: iron containing dust and coal containing dust recovered from various dust collectors in an iron works are blended to prepare a mixture, a cement-based aging binder is added to the mixture, and the mixture thus obtained is kneaded and formed. In this current production method of nonfired agglomerated ore, there is a problem that water of crystallization and a few % of adhesive water are contained since the hydration reaction based on a cement-based binder is invoked to ensure the product strength. Consequently, there is an apprehension that reduction retardation will occur in the shaft of a blast furnace and rapid heating bursting will also occur in the 500 to 700° C. region in the blast furnace, and hence the used amount of the above mentioned raw material is restricted to the content of 3% or less in relation to the main raw material used for the blast furnace; thus, the quality improvement of nonfired agglomerated ores is demanded from the viewpoint of raising the recycling rate in an iron works. Additionally, it has been reported that carbon containing nonfired pellets exhibit better development of reduction as compared to so-called non-carbonous sintered ores, fired pellets, and green ores that are usual raw materials for blast furnace; however, the carbon contents of these pellets mostly amount to only a few percents as a result of actual utilization modes of various types of dust in iron making and restraint for blending, and there are few reports on the optimal carbon content from the viewpoint of the blast furnace operation.

The present invention provides a drastic improvement measure for improving the deterioration behavior of the above described cement-based nonfired agglomerated ores, including reduction retardation and rapid heating bursting, from the viewpoint of the blast furnace operation. More specifically, the present invention provides a production method of a nonfired agglomerated ore wherein a carbon containing nonfired agglomerated ore is produced which contains carbon in an optimal content for blending dust raw materials and has a high cold strength; thus the reduction stagnation in the thermal reserve zone and reduction reaction equilibrium zone, known as an aspect of the blast furnace process, is avoided to promote the reduction; and the carbon containing effect and the improvement of the substrate strength by the binder are positively brought into effect, and the rapid heating bursting in the blast furnace is thereby prevented.

SUMMARY OF THE INVENTION

The present invention may be summarized as follows:

A carbon containing nonfired agglomerated ore for blast furnace, which is prepared in such a way that iron oxide and a carbonaceous material are blended with each other to prepare a mixture, a binder is added to the mixture, and the mixture is kneaded, formed, and cured, wherein the agglomerated ore contains carbon in the content of 80 to 120% of the theoretical quantity required to reduce the reducible oxygen in the iron ores to form metallic iron, and the binder is selected so that the crushing strength may be 7,850 kN/m$^2$ or more at room temperature.

The carbon containing nonfired agglomerated ore for blast furnace as set forth in the above description, wherein as iron oxide, there are used iron ores or various types of iron containing dust and carbon containing dust recovered from the dust collectors and the like in an iron works.

The carbon containing nonfired agglomerated ore for blast furnace as set forth in the above description, wherein such hydrocarbon-based additives as coking coal, plastic, waste toner, and the like are further blended with iron oxide and a carbonaceous material.

A production method of a carbon containing nonfired agglomerated ore for blast furnace, in which the agglomerated ore is prepared in such a way that iron oxide and a carbonaceous material are blended with each other, a binder is added to the mixture thus obtained and the mixture is kneaded and, formed, and cured, wherein the agglomerated ore contains carbon in the content of 80 to 120% of the theoretical quantity required to reduce the reducible oxygen in the iron ores to form metallic iron; the binder is selected so that the crushing strength may be 7,850 kN/m$_2$ or more at room temperature, and the kneading, forming, and curing are performed to prepare the agglomerated ore; and accordingly the reduction stagnation in the thermal reserve zone of the shaft of a blast furnace and the raw material shattering due to the rapid heating bursting are both effectively prevented.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will now be described in detail in accordance with the accompanying drawings.

Figure 1:
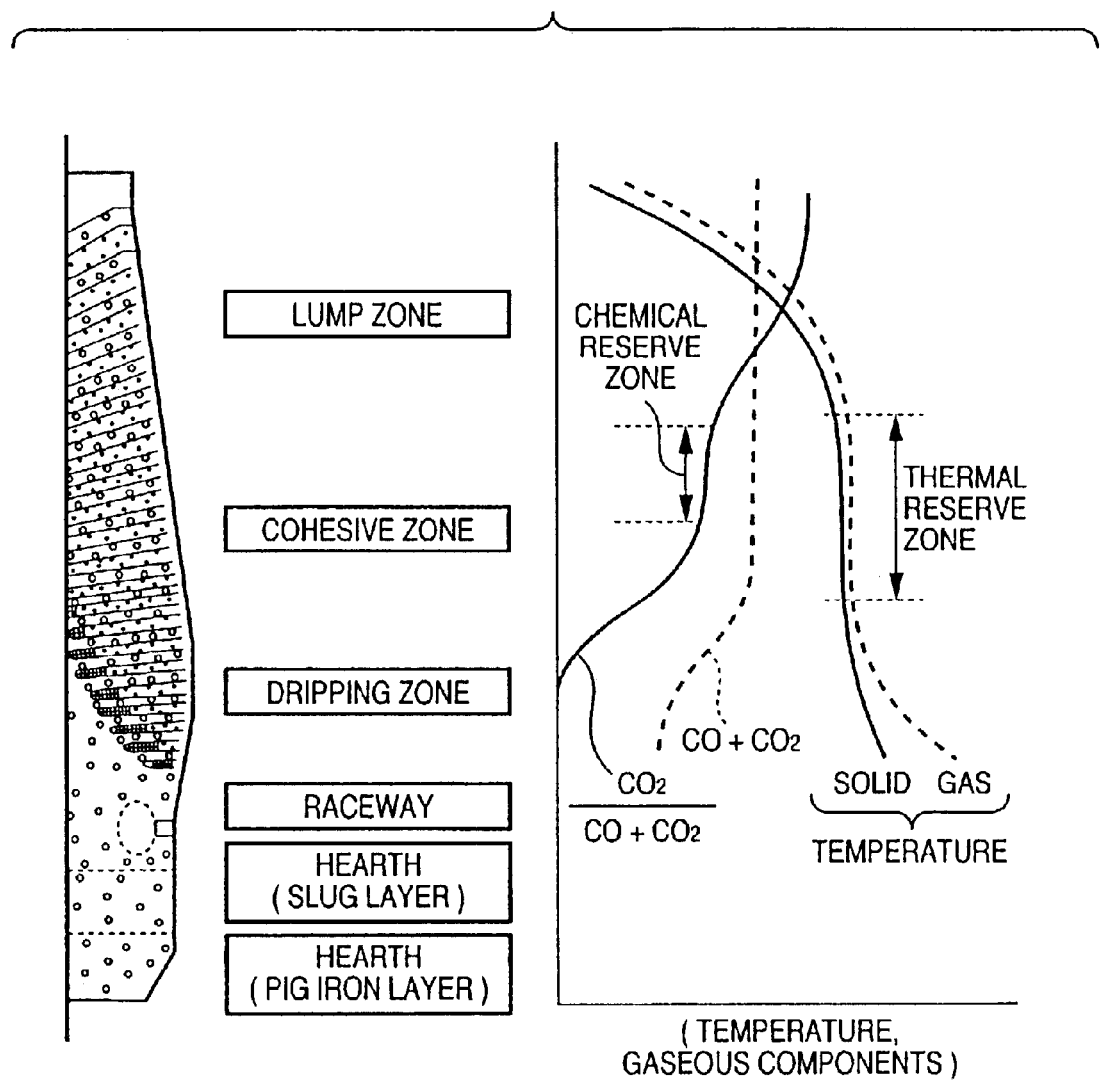
FIG. 1 shows a diagram illustrating the temperature distributions in the charged raw material and the reducing gas in a blast furnace.

In the first place, description is given of the gas temperature distribution, gas concentration distribution, and the stagnation of the reduction development in the thermal reserve zone and the reduction reaction equilibrium zone of the shaft of a blast furnace. FIG. 1 shows a diagram illustrating the temperature distributions of the charged raw material and the reducing gas in a blast furnace. The blast furnace process is a countercurrent reaction between the charged raw material and the reducing gas. As for the temperature rise of the charged raw material, the charged raw material is heated to 900 to 1100° C., as FIG. 1 shows, while coming down through the rapid heat exchange with the countercurrent reducing gas in the blast furnace, and thus the temperature difference between the gas and the charged raw material vanishes to reach an equilibrium. In the further lower part of the furnace, the heat supplied by the reducing gas causes the temperature rise in such a way that the temperature at the tuyere level reaches the highest temperature of the order of 1,600° C.

On the other hand, the blast furnace reducing gas of 2,200° C. or higher, generated at the tuyere level by hot air and combustion of coke, supplies the reaction heat necessary for the direct reduction reaction and melting of the iron ore, and consequently the temperature of the reducing gas is abruptly decreased down to a temperature of the order of 900 to 1100° C., and then reaches an equilibrium once; subsequently, the reducing gas exchanges heat with the charged raw material in the upper part of the shaft, and is discharged outside the furnace with a temperature of 100 to 200° C. The appropriate temperature distribution, regulated by the countercurrent heat transfer and reduction reaction between the charged raw material and the reducing gas, permits continuation of stable operation; in general, stable operation is possible when the heat flow ratio as shown in FIG. 1 is smaller than unity, namely, the temperature pattern is upward convex in the upper part of the shaft and downward convex in the lower part of the furnace.

Consequently, the thermal reserve zone of 900 to 1,100° C. is generated in the region between the middle portion of the shaft and the lower part of the furnace. The temperature in the thermal reserve zone is varied according to the ore/coke distribution along the direction of the furnace radius, as a result of the distribution control procedures chosen for the fuel ratio level and permeability measures. When the furnace fuel ratio is high, the equilibrium temperature of the thermal reserve zone is raised up to nearly 1,100° C. in the central part of the furnace where the ore/coke ratio along the direction of the furnace radius is low (namely, the heat flow ratio is low). In contrast, when the furnace fuel ratio is low in operation, the equilibrium temperature is lowered down to nearly 900° C. in the middle region of the furnace where the ore/coke ratio along the direction of the furnace radius is high (namely, the heat flow ratio is high).

Among the factors governing the development of the reduction of the raw material in a blast furnace, the factors associated with the reducing atmosphere in the blast furnace are the temperature of the reducing gas and the reduction degree [$CO/(CO+CO_2)$ referred to as $\eta-CO$]. It is generally known that the reduction is not developed beyond the reducibility constrained by the equilibrium gas reduction degree at the thermal reserve zone temperature, and accordingly the reduction stagnation occurs. The present invention avoids the above-described reduction stagnation.

Figure 2A:
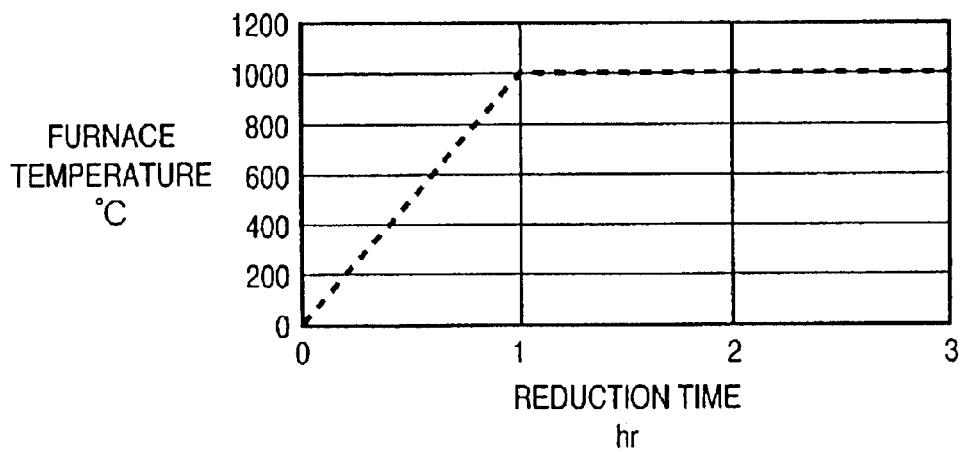
FIG. 2A shows a graph representing the temperature programmed heat pattern in the furnace.
Figure 2B:
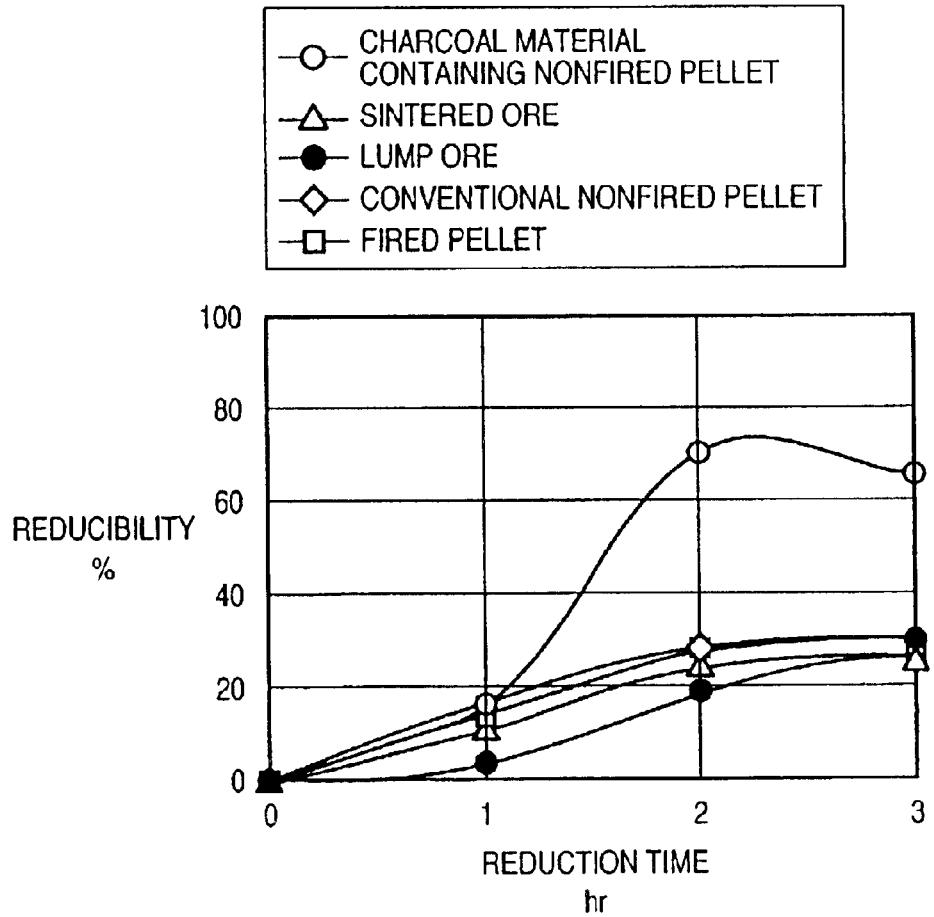
FIG. 2B shows a graph representing the reduction characteristics of different raw materials for blast furnace.

A detailed description is given below of the results of a study performed by the present inventors for the purpose of investigating the production of a nonfired agglomerated ore that permits the avoidance of the reduction stagnation. FIGS. 2A and 2B show the results of the reduction tests of the different charged raw materials in the heat pattern simulating the temperature rise in the shaft of a blast furnace. FIGS. 2A and 2B show the graphs representing the temperature-programmed heat pattern in the furnace and the reduction characteristics of different raw materials for blast furnace. FIG. 2A shows the temperature-programmed heat pattern inside the furnace, and FIG. 2B shows the reduction characteristics of different raw materials. As FIG. 2A shows, this is an example wherein the temperature reached 1,000° C. in one hour after the raw material charging, and the raw material stayed in the thermal reserve zone at 1,000° C. for 2 hours. FIG. 2B shows the reducibility transitions of the different raw materials in the case of the reductive atmosphere with a gas reduction degree of $\eta-CO=30\%$.

As the different types of raw materials, there were used the carbon containing nonfired pellet of the present invention, a conventional nonfired pellet, a sintered ore, an imported fired pellet, and an imported lump ore. The carbon containing nonfired pellet of the present invention was produced as follows:

(1) As for the carbonaceous material, the carbon containing nonfired pellet of the present invention is a pellet which contained the theoretical carbon quantity required to reduce the reducible oxygen in the iron ore to form metallic iron (a carbon reduction equivalent=1.0), and the carbon content of the pellet is 13.0%, which is considerably higher than the carbon contents of conventional nonfired pellets. As for the type of the carbonaceous material, the blast furnace first flue dust was mainly used to be blended for pellet preparation.

(2) Because the structure of the nonfired pellet becomes brittle with increasing content of the contained carbonaceous material, the high early strength portland cement was blended in a content of 10%, so that the crushing strength of 7,850 kN/m$^2$ or more was ensured after a curing period of 7 days, leading to a drastic improvement of the rapid heating bursting behavior.

The conventional nonfired pellet was a common nonfired pellet in a condition that the carbon reduction equivalent was 0.3, the carbon content was 3.5%, and the crushing strength was 4,900 kN/m$^2$ after the 7-days curing period, which was produced with pig iron dust as the raw material.

As can be seen clearly from FIGS. 2A and 2B, the ultimate reducibilities for the sintered ore which contains no contained carbonaceous material, the iron ore, and the imported fired pellet are as low as 30%, under the influence of the gas reduction degree $\eta-CO$ of 30% in the reducing atmosphere, from which the stagnation of the reduction development can be recognized. On the other hand, the carbon containing nonfired pellet of the present invention achieved an ultimate reducibility of 70% or higher, which shows that the reduction was developed remarkably as compared to the raw materials without carbon contained. The ultimate reducibility for the conventional nonfired pellet with a small carbon content was found to be considerably low. Description is made below on the grounds for the above described findings.

As for the gas reduction of the sintered ore containing no carbon, the iron ore, and the imported fired pellet, the gas reduction is developed through the diffusion of the reducing gas from the surface of the ore grains, and the ultimate reducibility is governed by the reduction temperature of the ore grain and the reduction degree ($\eta-CO$) of the reducing gas, so that the reduction development is stagnated when the reducibility achieves the gas reduction degree that is equilibrated theoretically at the temperature of the thermal reserve zone. In the present test, the gas reduction degree (η–CO) was set at 30% that is close to the theoretical equilibrium gas concentration in the thermal reserve zone, and hence the reduction stagnation occurs at the reducibility of the order of 30% that is equilibrated with the gas reduction degree.

On the other hand, the high ultimate reducibility of the carbon containing nonfired pellet with the carbon reduction equivalent of unity can be understood on the basis of the gas reduction development as follows: in addition to the reducing gas diffusion from the surface into the interior of the grain, the increased internal pressure due to the newly generated CO gas pushes out the reducing gas component with a low reduction degree that diffuses from the surface, where the CO gas is generated by the direct reduction of the oxygen in the iron ore by the carbon in the carbonaceous material contained in the interior of the grain; consequently, the surface of the carbon containing nonfired pellet is covered with the high reduction degree of CO gas generated from the interior of the pellet, and accordingly the gas concentration becomes such that the reducing power is stronger by far as compared to the reducing power of the equilibrium gas reduction degree at the thermal reserve zone temperature, which causes the above described high ultimate reducibility.

In other words, the carbon containing nonfired pellet is subjected to the reduction constraint at the temperature level of the thermal reserve zone in the blast furnace, but can avoid the influence of the equilibrium gas concentration in the thermal reserve zone so that the ultimate reducibility of the carbon containing nonfired pellet can be increased. The carbon content of the conventional nonfired lump ore is low in the carbon reduction equivalent in such a way that the carbon content does not reach the content required to avoid the reduction stagnation in the thermal reserve zone, resulting in an insufficient reduction development.

In the present invention, for the purpose of avoiding the reduction stagnation in the thermal reserve zone in a blast furnace, it is a necessary condition that the carbon content of the raw material is required to fall in the range no less than 80% and no more than 120% of the theoretical carbon quantity required to reduce the reducible oxygen of the iron ore (a carbon reduction equivalent=1). With the carbon content exceeding 120%, the carbon remains in the reduced iron and functions as a reducing agent or a melting accelerator in the blast furnace, but the superfluous content of carbon causes the degradation of the crushing strength so that the upper limit of the carbon content is set to be 120%. In this connection, the above-described theoretical carbon quantity is based on the following chemical formulas:

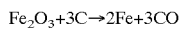

$Fe_2O_3 + 3C \rightarrow 2Fe + 3CO$

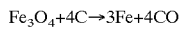

$Fe_3O_4 + 4C \rightarrow 3Fe + 4CO$

As described above, the advantage of the carbon containing nonfired pellet of the present invention is such that the carbon contained in the nonfired pellet reacts with the oxygen in the iron ore so that the reducing CO gas is newly generated from the interior of the pellet to seal the outer surface of the pellet, and hence the pellet can avoid the equilibrium gas concentration at the ambient temperature, namely, the temperature of the thermal reserve zone. On the other hand, the reaction between the carbon contained in the nonfired pellet and the oxygen is a direct reduction reaction, which is highly dependent on the temperature and generally requires a temperature of 900° C. or higher. The temperature of the thermal reserve zone in the blast furnace falls in the range from 900 to 1,100° C. The effect of the thermal reserve zone on the ultimate reducibility was experimentally investigated and the results obtained are shown in FIG. 3.

Figure 3:
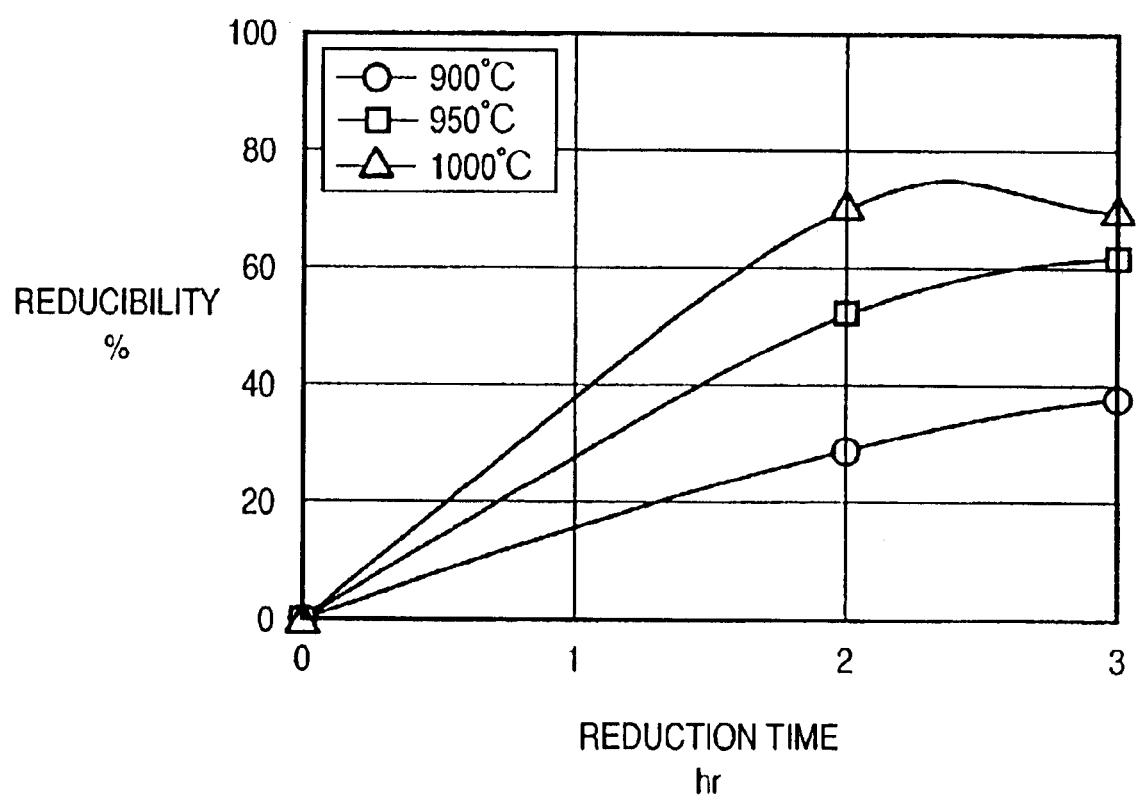
FIG. 3 shows a graph representing the reduction characteristics of a carbonaceous material containing nonfired pellet in the temperature range from 900 to 1000° C.

FIG. 3 shows the reduction characteristics for the carbonaceous material containing nonfired pellet observed in the temperature range from 900 to 1,000° C. From the results shown in FIG. 3, when the temperature of the thermal reserve zone in the blat furnace is not lower than 950° C., the reduction stagnation is low and the reduction is developed, while when the temperature of the thermal reserve zone in the blast furnace is 900° C., the direct reduction reaction between the contained carbon and the oxygen is not developed sufficiently so that the effect of the equilibrium gas concentration cannot be positively avoided at the temperature of the thermal reserve zone. The present inventors provides the carbon containing nonfired pellet, wherein a highly reactive type of carbon is selected for the contained carbon, or there are beforehand contained coking coal, plastic, waste toner, and the like that are decomposed generally at 300 to 500° C. to evolve light hydrocarbons, hydrogen, and gaseous CO, in order to implement a method for avoiding the effect of the equilibrium gas concentration in the thermal reserve zone falling in the temperature region of 900° C. where the direct reduction between the carbon and the oxygen in the iron ore occurs to an insufficient extent.

Figure 4A:
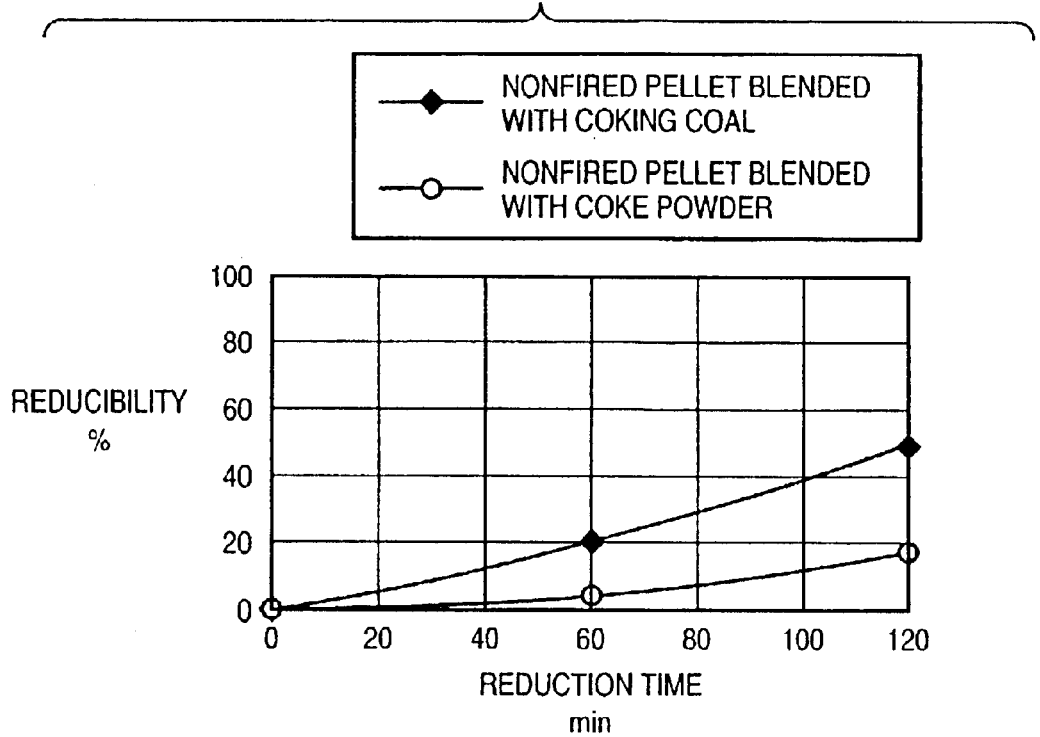
FIG. 4A shows a graph representing the relations between the reduction time and the reducibility of a nonfired pellet blended with a coking coal and a nonfired pellet blended with a coke powder.

FIG. 4A shows the relations between the reduction time and the reducibility of a nonfired pellet blended with a coking coal having high volatile matter content and a nonfired pellet blended with a coke powder having no volatile matter content.

Figure 4B:
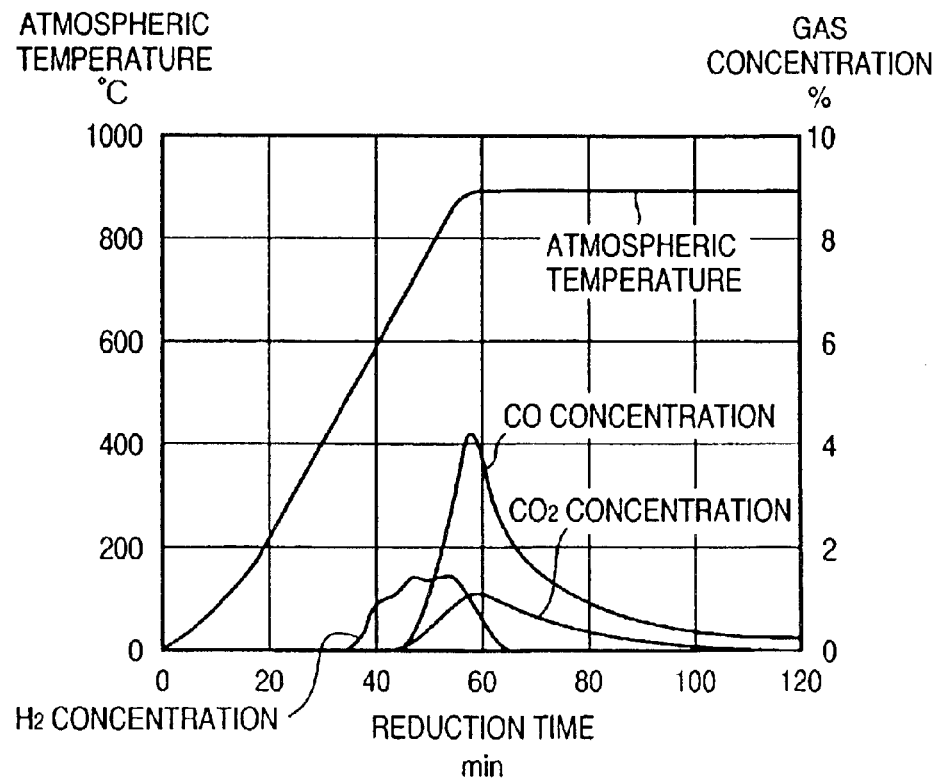
FIG. 4B shows a graph representing the relations between the reduction time and the atmospheric temperature and gas concentrations in the nonfired pellet blended with a coking coal.

FIG. 4B shows the relations between the reduction time and the atmospheric temperature and gas concentrations in the nonfired pellet blended with a coking coal.

As can be seen clearly from these figures, the hydrocarbon based reducing agents such as coking coal and the like are decomposed from around 400° C. to evolve hydrogen-based reducing gases, which govern the interior and the surface of the carbon containing nonfired pellet, and thus the evolved gases play the role alternative to the direct reduction reaction between the carbon and the oxygen in the iron ore even in the temperature range where the direct reduction occurs to an insufficient extent, so that the effect of the equilibrium gas concentration in the temperature of the thermal reserve zone can be avoided to result in the high ultimate reducibility. In other words, it has been found that the addition of such hydrocarbon-based reducing materials as coking coal, plastic, waste toner, and the like is effective as a method for avoiding the reduction stagnation in the temperature range from 900 to 950° where the direct reduction reaction between carbon and oxygen is inert.

Next, description is given below of a major requisite of the present invention, namely, ensuring the strength of the carbon containing nonfired pellet.

A blast furnace is a countercurrent reaction furnace involving a gas and a charged raw material. And the raw material quality control on the basis of the process study is performed by setting experimentally and empirically the quality control indexes for the raw material charged into the blast furnace through taking account of the following strengths: the strength required of the raw material is such that it should be sufficient to bear the handling, conducted before being charged into the blast furnace, including the transfer operation and the grain size selection operation; the abrasion resistance strength against the rolling movement and grinding down occurring while the raw material charged into the blast furnace comes down successively to the lower part of the blast furnace; and the high temperature strength that can bear the embrittlement of the mineral structure of the ore due to the reduction development and thermal history. Incidentally, as for the quality control of the conventional nonfired agglomerated ores, the cold crushing strength has been controlled on the basis of a level of the order of 4,900 kN/m².

The present inventors investigated the improvement measures focusing on the improvement of the rapid heating bursting property of the nonfired agglomerated ore in the blast furnace, as the explosion is regarded as the major weakness of the nonfired agglomerated ore, examined the conventionally conducted strength tests for various types of raw materials by taking a sintered ore, an imported fired pellet, and an imported ore as the comparative raw materials, and thus studied the measure for improving the strength required to the carbon containing nonfired agglomerated ore of the present invention. As for the raw material test methods, the measurements were conducted for the crushing strength, rapid heating bursting property, and crushing strength after reduction; description is given below of the individual test methods of raw materials.

Cold crushing strength: in conformity with JIS M8718 "the test method of crushing strength for iron ore pellet," the compressive load is applied to a test specimen with a predetermined velocity of the pressurizing plate, and the load is measured when the test specimen is broken down. The strength index is represented as the load value per unit sectional area.

Evaluation of the rapid heating bursting performance: the rapid heating treatment is conducted by putting a test specimen into an electric furnace for which the temperature is set at a predetermined value (5 test specimens are evaluated under the same test conditions), and the occurrence of bursting is visually examined.

Crushing strength after reduction: to a test specimen subjected to reduction under the predetermined reduction conditions, a compressive load is applied in a manner similar to that in the above described cold crushing test, and the load is measured when the test specimen is broken down. The strength index is represented as the load value per unit sectional area.

Tumbler strength: 500 g of test specimen is charged into a tumbling barrel which is rotated for 30 minutes at a rate of 900 revolutions per minute. Then, the test specimen is riddled with a 3 mm sieve, and the strength index is represented by the −3 mm fine-ore ratio.

Shatter strength: in conformity with JIS M8711 "the method of shatter test for sintered iron ore," a sample specimen of 10 to 19 mm is put in a test box of 20±0.2 kg, the box is dropped 16 times to a 10 mm thick sheet of iron plate from 2 m above the iron sheet, then the test specimen is riddled with a 5 mm sieve, and the strength index is represented by the −5 mm fine ore ratio.

It is necessary to considerably increase the content of the contained carbon in the carbon containing nonfired pellet of the present invention wherein steelmaking dust is used as a raw material and the carbon reduction equivalent is unity, and degradation of the crushing strength is expected to occur empirically; thus, as a measure for improving the strength, a carbon containing nonfired pellet was produced and evaluated which contained early strength portland cement in a content of 10% in place of the conventional aging binder consisting of Esment contained in a content of 5% and quicklime contained in a content of 1% as an activator.

Figure 5A:
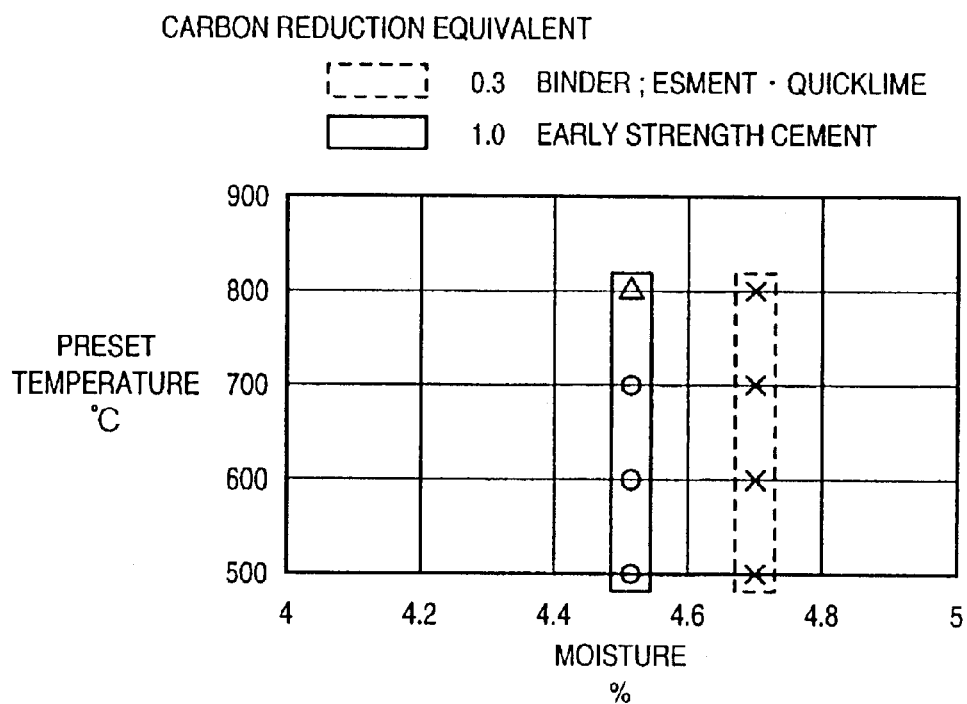
FIGS. 5A and 5B show graphs representing the relation between the rapid heating bursting characteristics and the preset temperature for nonfired pellets.
Figure 5B:
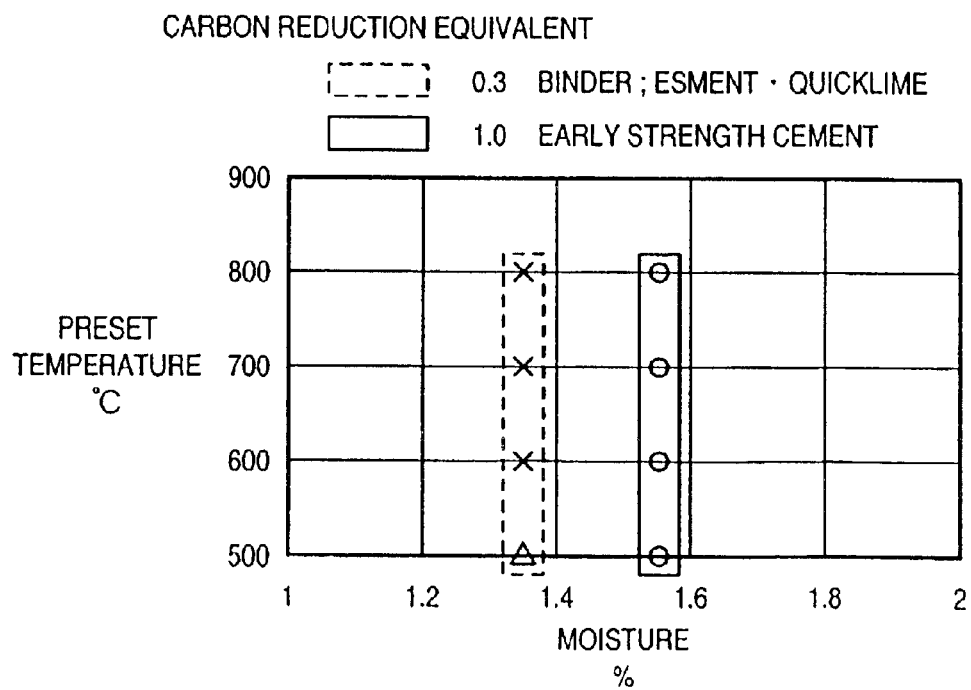

The measurement results for the crushing strength and crushing strength after reduction, and rapid heating bursting property are shown respectively in TABLE 1 and FIGS. 5A and 5B. FIGS. 5A and 5B show the relation between the rapid heating bursting property and the preset temperature. As can be seen from TABLE 1, the crushing strength of the carbon containing nonfired pellet containing the conventionally used binder lies on a lower level as compared to those of the other raw materials for blast furnace, but the crushing strength of the carbon containing nonfired pellet of the present invention, in which early strength portland cement is used in a content of 10%, is improved to lie on a high level of crushing strength as compared to those of the other raw materials for blast furnace.

TABLE 1

|  |  | Cold crushing strength of raw material for blast furnace (in units of kN/m²) | Crushing strength after reduction of raw material for blast furnace (in units of kN/m²) |
|---|---|---|---|
| Carbon containing nonfired pellets | Esment (5%) + quicklime (1%) | 4510 | 510 |
|  | Early strength cement (10%) | 10590 | 1410 |
| Conventional raw materials for blast furnace | Fired pellet | 23540 | 1030 |
|  | Sintered ore | 4810 | 470 |
|  | General lump ore | 10890 | 280 |
|  | Dense lump ore | 20990 | 3090 |
|  | Conventional nonfired pellet | 4510 | 320 |

A raw material for blast furnace contains moisture according to the handling processes involved in the production process and the other processes before being charged into the blast furnace. Particularly, as for a nonfired agglomerated ore, appropriate amounts of water are required respectively in the granulating and forming processes, additionally a cement-based aging binder develops the strength through hydration reaction, and hence the water of crystallization and adhesive water are more abundant than in other raw materials so that there is the weakness of the poor rapid heating bursting property in blast furnace which is required to be improved with some measure. In the above described test method concerned, test specimens with various moisture contents were put into the electric furnace which was maintained at respective preset temperatures ranging from 500 to 800° C., and the occurrence of the rapid heating bursting was evaluated and the evaluation results thus obtained are shown in FIGS. 5A and 5B. In these figures, ○ signifies the sound evaluation result wherein 5 test specimens were tested and no specimen exhibited rapid heating bursting, Δ signifies the result wherein one to four specimens exhibited rapid heating bursting, and x signifies the result wherein all the 5 specimens exhibited rapid heating bursting.

From the results of the above described tests, it has been revealed that the conventional pellet containing Esment in 5% with a carbon reduction equivalent of 0.3 exhibits rapid heating bursting to be shattered even with the moisture of 1 to 2% under the rapid heating bursting condition with the temperature of 500° C. On the other hand, the carbon containing nonfired pellet of the present invention, containing portland cement in a content of 10%, was found to be sound so as not to exhibit rapid heating bursting even with the moisture of 4 to 5% and under the rapid heating bursting condition of 700° C. or higher. Conceivably, the reason for this is such that rapid heating bursting due to the rapid vaporization of the moisture at a high temperature was avoided owing to the fact that the increased carbon content made the high temperature vapor get away easily and the pellet substrate strength was improved by blending early strength portland cement; thus, it has been revealed that the avoidance of rapid heating bursting in the temperature region from 500 to 700° C. as effected in the present invention is the important and necessary condition for a carbon containing nonfired agglomerated ore.

Additionally, the results obtained for the crushing strength test conducted after the reduction test are shown in TABLE 1. With developing reduction, the crushing strength after reduction is decreased for any of the charged raw materials. This results from the effects of the phase variation and the increased porosity in the reduced structure. The results shown in TABLE 1 were obtained after the reduction for 3 hours by the reducing gas simulating the reduction condition in a blast furnace. In the case of the present invention where the early strength portland cement is contained in the content of 10%, the crushing strength after reduction is by no means inferior to those of the sintered ore and imported ore.

As described above, the carbon containing nonfired pellet of the present invention contains carbon in the content corresponding to the theoretical carbon quantity required to reduce iron ore to metallic iron and is produced by blending the early strength portland cement in 10% so as to have the room temperature crushing strength of 7,850 kN/m$^2$ or more; and the thus formed pellet of the present invention has been confirmed to be an excellent raw material for blast furnace which can drastically improve both the prevention of the reduction stagnation at the temperature of the thermal reserve zone in a blast furnace and the rapid heating bursting that is regarded as a weakness of conventional nonfired agglomerated ores.

Embodiment

Description is made below on the production of a carbon containing nonfired pellet according to the method of the present invention in an industrial scale, the quality of the product thus produced, and the evaluation of the product as used in a blast furnace.

Carbon containing nonfired pellets have been produced which are blended with the dusts generated in an iron works and have different levels of carbon reduction equivalent ratio. TABLE 2 shows the compositions of the raw materials. In the cases of No. 1 to No. 3 of the raw material composition, the blending amount of the blast furnace first flue dust was varied from 10 to 30% for the purpose of varying the carbon reduction equivalent, and thus the carbon containing nonfired pellets were produced which had respectively the carbon reduction equivalents of 0.8, 1.0, and 1.2. As the binder, early strength portland cement was blended in the content of 10% for the purpose of improving the crushing strength and rapid heating bursting property.

Figure 6:
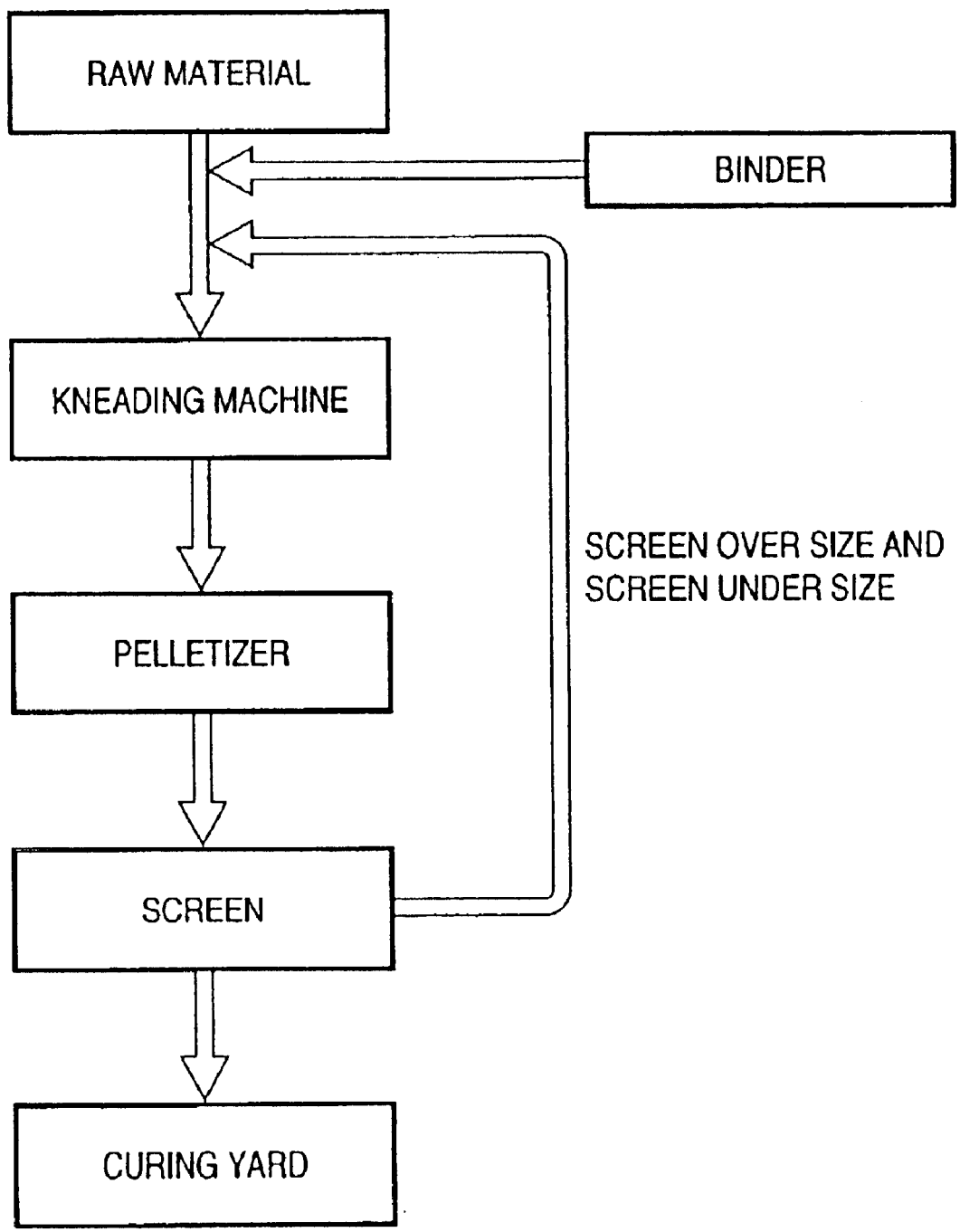
FIG. 6 shows a flow chart representing the industrial production of a carbon containing nonfired pellet.

FIG. 6 shows a flow chart representing the industrial production of a carbon containing nonfired pellet. The production of the pellet produced in the present invention was made as follows: the raw materials listed in the raw material composition table were take out from the respective component vessels; the raw materials were humidified, pulverized and kneaded in a wet ball mill to prepare a mixture; the moisture of the mixture was adjusted with a mixer; the mixture was granulized by a Disc Pelletizer of a diameter of 6 mm to produce pellets of 5 to 15 mm in diameter; the pellets were cured for 4 days in a roofed curing yard; and then the pellets were transferred to a raw material yard. For each case, the production conditions and the aspects of green pellets including the production (t/h), the granulation yield, and the like are shown in TABLE 2.

TABLE 2

| | No. | | | |
|---|---|---|---|---|
| | 1 | 2 | 3 | 4 |
| Blast furnace first flue dust | 10 | 20 | 30 | — |
| Converter dust fine grain | 15 | 15 | 15 | 12 |
| Converter dust coarse grain | 18 | 18 | 18 | 7 |
| Sintering dust | 29 | 19 | 9 | 35 |
| Iron sand | 18 | 18 | 18 | 35 |
| Dehydrated cake | — | — | — | 5 |
| Esment | — | — | — | 5 |
| Quicklime | — | — | — | 1 |
| Early strength cement | 10 | 10 | 10 | — |
| Granulation yield | 97.6 | 92.9 | 92.9 | 93.5 |
| Production (t/h) | 36.2 | 31.4 | 29.9 | 31.0 |
| Remarks | Examples of the present invention | | | Comparative example |

The bulk density of the raw material was decreased by increasing the amount of the blast furnace first flue dust, and accordingly the production (t/h) and the granulation yield were lowered, but the productivity was able to maintain a high level of 30 t/h. The variation of the room temperature crushing strength against the number of curing days is shown in TABLE 2; a satisfactory product was able to be obtained which had a 7-day strength of 7,850 kN/m$^2$ or more. For the carbon containing nonfired pellet of Example No. 2 (with the blast furnace first flue dust content of 20%) which has a carbon reduction equivalent close to unity, the test results for the tumbler strength as the abrasion/impact strength index, shatter strength, rapid heating bursting property, and temperature-programmed reduction test with η–CO 30% are shown in TABLE 3; carbon containing nonfired pellets were able to be produced any of which was able to achieve the object of the present invention. Blast furnace operation was conducted with a product of the present invention blended in the charged raw material in a content of 10%, resulting in a stable operation confirmed.

TABLE 3

| | Tumbler strength (−3 mm %) (%) | Shatter strength (−5 mm %) (%) | Reducibility (%) |
|---|---|---|---|
| Example No. 1 of the present invention | 1.03 | 0.05 | 53.76 |
| Example No. 2 of the present invention | 1.84 | 0.67 | 70.80 |
| Example No. 3 of the present invention | 2.65 | 1.29 | 71.89 |
| Comparative example No. 4 (conventional nonfired pellet) | 7.10 | 5.43 | 30.10 |
| Sintered ore | 2.46 | 7.90 | 26.90 |
| Fired pellet | 3.41 | 2.02 | 28.90 |
| Conventional nonfired pellet | 7.10 | 5.43 | 30.10 |

As described above, the quality improvement according to the present invention permits alleviation of the conventional constraints imposed on blending so that the recycling of dusts in an ironworks can be promoted, and consequently such resources as iron ore, coking coal, and the like can be effectively utilized. The pellets of the present invention can avoid the reduction stagnation as observed in the thermal reserve zone for the sintered ore and the like which do not contain carbon, and accordingly the reduction development becomes fast and the fuel ratio can be reduced. Additionally, the fast development of reduction raises the metallization ratio in the blast furnace cohesive zone, and the pellets of the present invention are excellent in high temperature characteristics and can contribute to stabilize the blast furnace permeability. The products of the present invention are the raw materials which contain the carbonaceous materials for reduction such as fine carbon grains in the dusts, CDQ powder, coking coal, and the like in a content of the carbon reduction equivalent, and accordingly can produce iron without consuming the lump coke in a blast furnace, thus contributing to the reduction of the blast furnace fuel cost.

As many apparently widely different embodiments of the present invention can be made without departing from the spirit and scope thereof, it is to be understood that the invention is not limited to the specific embodiments thereof except as defined in the claims.

What is claimed is:

1. A carbon containing agglomerated ore for a blast furnace, wherein said carbon containing agglomerated ore is non-fired;

said carbon containing agglomerated ore contains carbon in a content of 80 to 120% of a theoretical carbon quantity required to reduce iron oxide; and said carbon containing agglomerated ore having a crushing strength of 7,850 kN/m$^2$ (80 kg/cm$^2$) or more at room temperature, which is prepared in a way that iron oxide and carbonaceous material are blended with each other to prepare a mixture, a binder is added to the mixture, and the mixture is kneaded, formed to pellets and briquettes and cured.

2. The carbon containing nonfired agglomerated ore for the blast furnace according to claim 1, wherein the theoretical carbon quantity is an amount of carbon required to reduce reducible oxygen in the iron ore to form metallic iron by blending a carbonaceous material.

3. The carbon containing nonfired agglomerated ore for the blast furnace according to claim 1, wherein, as iron oxide, iron ores or iron-containing dust and carbon-containing dust which are recovered from dust collectors in an iron works are used.

4. A production method of a carbon containing nonfired agglomerated ore for a blast furnace, in which the method of preparing the nonfired agglomerated ore comprises:

adding binders which have hardening characteristics, depending on a hydration reaction, to powdered iron oxide, kneading the mixture and forming the mixture into a predetermined shape; and performing hydration curing, wherein the agglomerated ore contains a content of 80 to 120% of a theoretical amount of carbon, the binder is selected to provide a crushing strength of 7,850 kN/m$^2$ (80 kg/cm$^2$) or more at room temperature, and the kneading, forming and curing are performed to minimize reduction stagnation in a thermal reserve zone of a shaft of a blast furnace and raw material shattering due to rapid heating bursting.

5. The carbon containing nonfired agglomerated ore for the blast furnace according to claim 1, wherein the iron oxide and carbon are selected from the group consisting of sintering dust, blast furnace dust and converter dust.

6. The carbon containing nonfired agglomerated ore for the blast furnace according to claim 2, wherein the iron oxide and carbon are selected from the group consisting of sintering dust, blast furnace dust and converter dust.

7. The carbon containing nonfired agglomerated ore for the blast furnace according to claim 1, wherein the ore is prepared by blending coal with a carbonaceous material.

8. The carbon containing nonfired agglomerated ore for the blast furnace according to claim 3, wherein the iron ores or iron-containing dust and carbon-containing dust are selected from the group consisting of sintering dust, blast furnace dust and converter dust.

9. The production method of claim 4, wherein the binders are selected from the group consisting of cement and blast furnace slag.

* * * * *

UNITED STATES PATENT AND TRADEMARK OFFICE
CERTIFICATE OF CORRECTION

PATENT NO. : 6,918,944 B2
DATED : July 19, 2005
INVENTOR(S) : Hideo Kanoshima et al.

It is certified that error appears in the above-identified patent and that said Letters Patent is hereby corrected as shown below:

<u>Column 11,</u>
Line 35. after "briquettes" insert -- , --.

Signed and Sealed this

Eighteenth Day of April, 2006

JON W. DUDAS
*Director of the United States Patent and Trademark Office*